United States Patent
Chang

(10) Patent No.: US 7,481,569 B2
(45) Date of Patent: Jan. 27, 2009

(54) DIRECT TYPE BACKLIGHT MODULE

(75) Inventor: Shao-Han Chang, Tu-cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 83 days.

(21) Appl. No.: 11/505,562

(22) Filed: Aug. 16, 2006

(65) Prior Publication Data

US 2007/0127270 A1 Jun. 7, 2007

(30) Foreign Application Priority Data

Dec. 7, 2005 (CN) ........................ 2005 1 0102306

(51) Int. Cl.
*F21V 7/04* (2006.01)
(52) U.S. Cl. ........................ 362/633; 362/300; 362/362; 362/368; 362/632; 362/634
(58) Field of Classification Search ................ 362/300, 362/362, 368, 632–634
See application file for complete search history.

(56) References Cited

U.S. PATENT DOCUMENTS

| 6,175,396 | B1 * | 1/2001 | Kim et al. ...................... 349/58 |
| 6,835,961 | B2 | 12/2004 | Fukayama |
| 7,125,157 | B2 * | 10/2006 | Fu et al. ...................... 362/632 |
| 2005/0243238 | A1 * | 11/2005 | Cha et al. ...................... 349/58 |
| 2005/0254236 | A1 * | 11/2005 | Fu et al. ...................... 362/186 |

FOREIGN PATENT DOCUMENTS

TW    1241442    10/2005

* cited by examiner

*Primary Examiner*—Sandra L. O'Shea
*Assistant Examiner*—Meghan K. Dunwiddie
(74) *Attorney, Agent, or Firm*—Morris Manning Martin LLP; Tim Tingkang Xia, Esq.

(57) ABSTRACT

A direct type backlight module includes a frame, at least an optical sheet, and at least a light guide source. The frame includes a plurality of peripheral sidewalls, at least one holding portion defined in a top of the sidewalls, and an elastic member defined in the holding portion. The optical sheet having a positioning hole corresponding to the elastic member is fixed in the frame by the elastic member being mounted into the positioning hole thereby pushing an inner surface of the positioning hole towards an outer area of the optical sheet. The light source is disposed under the optical sheet. The optical sheet may be fixed on the frame tightly, and may avoid being deformed effectively due to a stretching force produced by the elastic member.

14 Claims, 4 Drawing Sheets

DIRECT TYPE BACKLIGHT MODULE

TECHNICAL FIELD

The present invention relates to backlight module, more particularly, to a direct type backlight module for use in, for example, a liquid crystal display (LCD).

BACKGROUND

In a liquid crystal display device, liquid crystal is a substance that does not itself illuminate light. Instead, the liquid crystal relies on reflecting light from a light source, thereby displaying images and data. In the case of a typical liquid crystal display device, a backlight module powered by electricity supplies the needed light.

Referring to FIG. 6, a typical bottom-lighting backlight module 10 is shown. The backlight module 10 includes a frame 11, a plurality of optical sheets 13 and a plurality of light sources (not shown). The frame 11 is a rectangular-shaped with four peripheral sidewalls 112. Two holding recesses 112 are respectively defined on a top of two opposite sidewalls 112, and two positioning pins 114 are respectively defined on a bottom surface of each holding recess 112. Each optical sheet 13 is in a similar rectangular shape according to the frame 11. The optical sheet 13 includes two protrusions 132 and two positioning holes 134. The two protrusions 132 are defined in the periphery area of the optical sheet 13 corresponding to the holding recess 112. The two positioning holes 134 are respectively defined in the protrusions 132 according to the positioning pins 114. The optical sheets 13 may be fixed on the top of the frame 11 by mounting the positioning pins 114 in the corresponding positioning holes 134. The light sources (not shown) are disposed under the optical sheet.

However, the structures, i.e. the holding recesses 112 and the positioning pins 114, employed for positioning and holding the optical sheets 13 relative to the frame 11 in the above typical direct type backlight module 10 has the following drawbacks to be solved.

In order to adjust to the deformation of the optical sheets 13, diameters of the two opposite positioning holes 134, are configured to be different, such as one positioning hole 134 having a smaller diameter is used to precisely position the optical sheets 13 by the corresponding positioning pin 114 inserted therethrough, and the other positioning hole 134 having a larger diameter is used to configure a suitable larger space to engage with the corresponding positioning pins 114 when the optical sheets expand and contract. However, the optical sheets 13 may also deformed due to the following other reason: un-uniformity temperature distribution in the backlight module, different variables produced when manufacturing and assembling the backlight module, and so on.

What is needed, therefore, is a direct type backlight module that overcome the above mentioned drawbacks.

SUMMARY direct type backlight module according to a preferred embodiment includes a frame, at least an optical sheet, and at least a light guide source. The frame includes a plurality of neighboring peripheral sidewalls, at least one holding portion defined in a top of the sidewalls, and an elastic member fixed in the holding portion. The optical sheet having a positioning hole corresponding to the elastic member is fixed in the frame by the elastic member being mounted into the positioning hole thereby only pushing a part of an inner surface of the positioning hole adjacent towards an outer area of the optical sheet. The light source is disposed under the optical sheet.

Other advantages and novel features will become more apparent from the following detailed description of the preferred embodiments, when taken in conjunction with the accompanying drawings.

BRIEF DESCRIPTION OF THE DRAWINGS

Many aspects of the present direct type backlight module can be better understood with reference to the following drawings. The components in the drawings are not necessarily drawn to scale, the emphasis instead being placed upon clearly illustrating the principles of the present direct type backlight module. Moreover, in the drawings, like reference numerals designate corresponding parts throughout the several views.

DETAILED DESCRIPTION OF THE PREFERRED EMBODIMENTS

Reference will now be made to the drawings to describe preferred embodiments of the present direct type backlight module, in detail.

Figure 1:
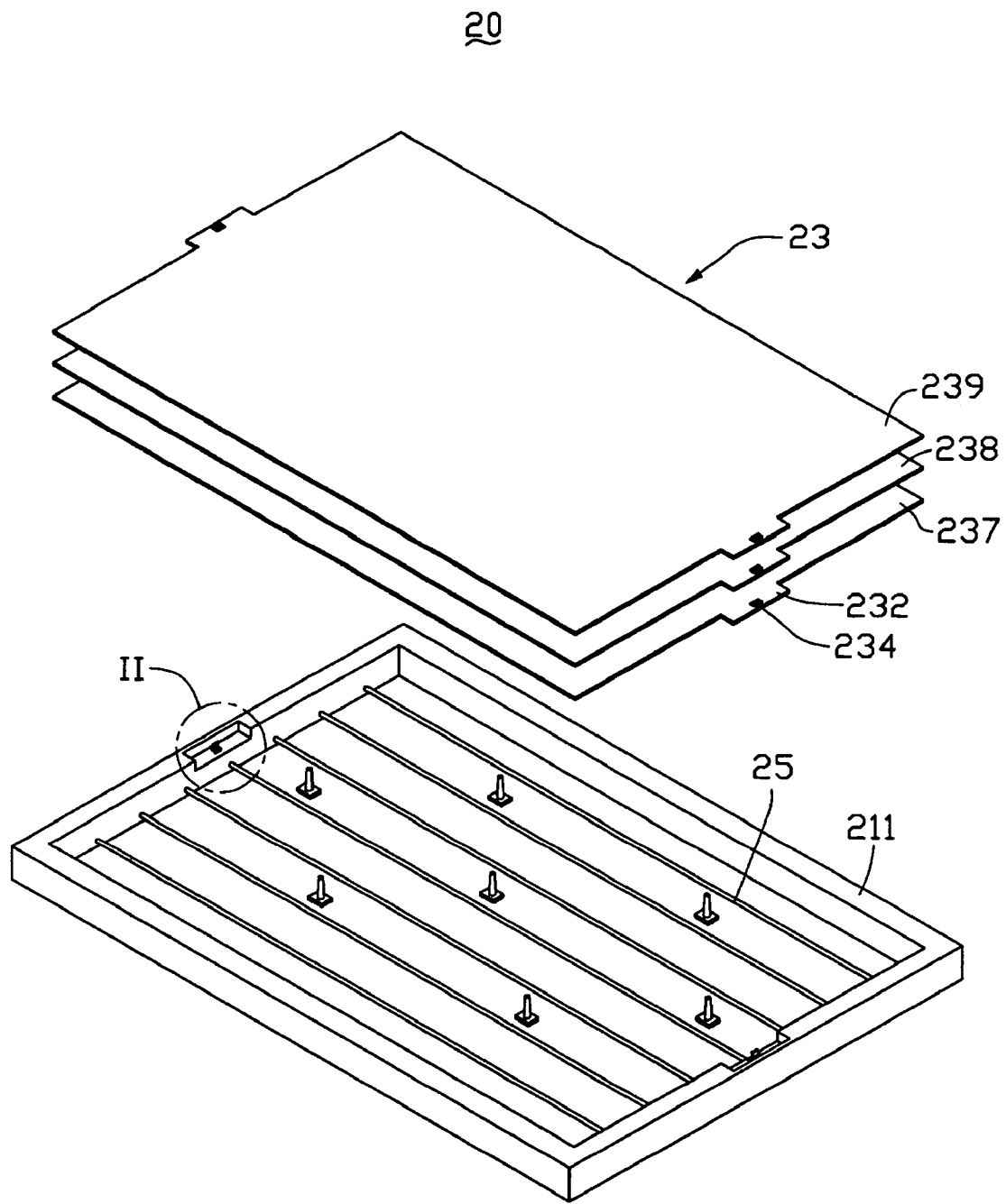
FIG. 1 is a schematic, exploded isometric view of a direct type backlight module according to a first preferred embodiment.
Figure 2:
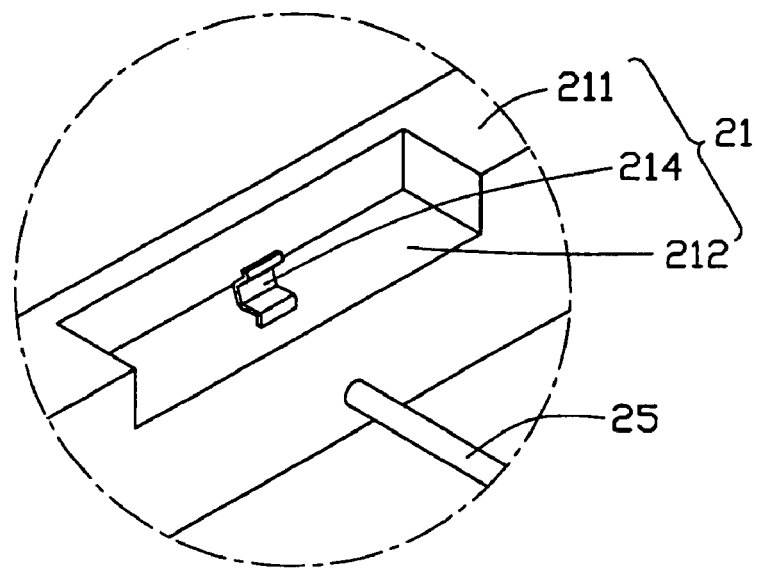
FIG. 2 is an enlarged view of a circular portion III-III of FIG. 1.

Referring to FIGS. 1 and 2, a direct type backlight module 20 in accordance with a first preferred embodiment is shown. The direct type backlight module 20 includes a frame 21, three optical sheets 23 and a plurality of cold cathode fluorescent lamps 25. The frame 21 is a rectangular-shaped that includes four peripheral sidewalls 211, two holding portions 212 and two elastic members 214. The two holding portions 212 are respectively formed on a top of the two opposite sidewalls 211. Each holding portion 212 is configured to be a rectangular recess having a side opening (not labeled) facing an inner area of the frame 21. The two elastic members 214 are respectively positioned on a bottom surface of the holding portion 212. The optical sheets 23 are of a similar rectangular shape according to the frame 21, so as to be received in the frame 21. Each optical sheet 23 includes two protrusions 232 and two positioning holes 234. The two protrusions 232 are defined in the periphery area of the optical sheets 23 corresponding to the holding portion 212. The two positioning holes 234 are respectively defined in the protrusions 232 according to the positioning pins 214. The cold cathode fluorescent lamps 25 are arranged under the optical sheets 23, and are fixed to the sidewalls 211 of the frame 21.

Figure 3:
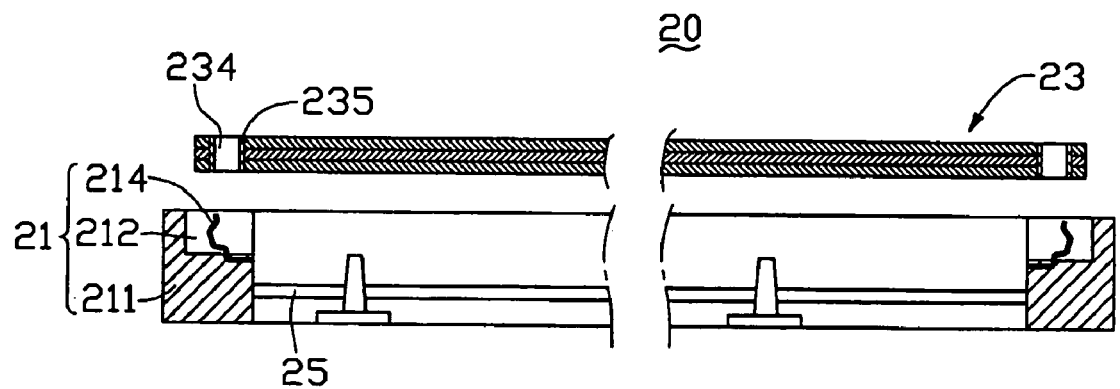
FIG. 3 is a schematic, cross-sectional view of the direct type backlight module of FIG. 1 before being assembled.
Figure 4:
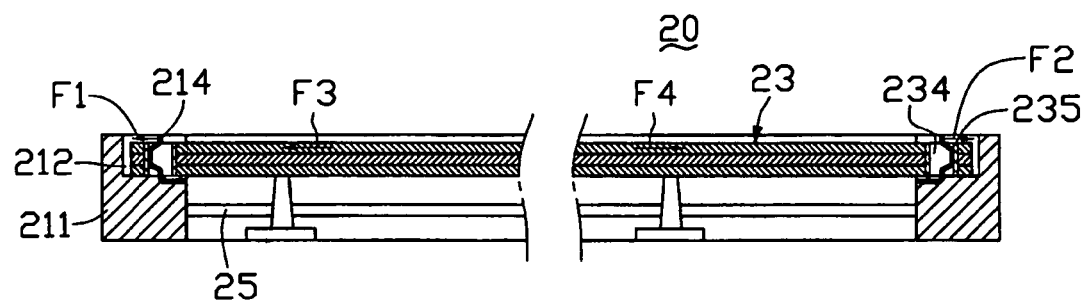
FIG. 4 is a schematic, cross-sectional view of the direct type backlight module of FIG. 1 after being assembled.

Also referring to FIGS. 3 and 4, when the optical sheets 23 are assembled in the frame 21, the elastic members 214 may be respectively mounted into the corresponding positioning holes 234 for pushing an inner surface of the positioning holes 234 toward an outer area of the optical sheets 23. Two opposite pulling forces F1 and F2 produced by the resilient bend of the elastic members 214 pull the optical sheets 23 along directions facing the outer area of the frame 21, thus the optical sheets 23 have two opposite stretching forces F3 and F4 along directions facing the outer area of the frame. Therefore, the optical sheets 23 may be fixed on the top of the frame 21 due to the two stretching forces F3 and F4.

In the embodiment, the direct type backlight module 20 may further include two hollow columnar members 235 engaged in the corresponding positioning holes 234 of the optical sheets 23, thus the three optical sheets may be uniformly pressed by the elastic members 214. Also referring to FIGS. 1 and 3, the three optical sheets 23 include a light diffusion sheet 237, a prism sheet 238 and a polarizer sheet 239 stacked on the frame 21 in that order.

When the optical sheets 23 expand due to high temperatures, each positioning hole 234 of the optical sheets 23 may have a slight displacement along a direction toward the outer area of the frame 21. Simultaneously, each elastic member 214 decreases its resilient bend to absorb the slight displacement. The optical sheets 23 still suffer the stretching forces F3 and F4 along the two opposite directions toward the outer area of the frame 21, thus the optical sheets 23 would not be easily deformed. In the same way, when the optical sheets 23 contract, each positioning hole 234 of the optical sheets 23 may have a slight displacement along a direction toward the inner area of the frame 21. Simultaneously, each elastic member 214 increases its resilient bend to absorb the slight displacement. Therefore, the optical sheets 23 may be fixed on the frame 21 tightly, and may avoid being deformed effectively by the stretching forces F1 and F2 pulled by the elastic member 214.

Figure 5:
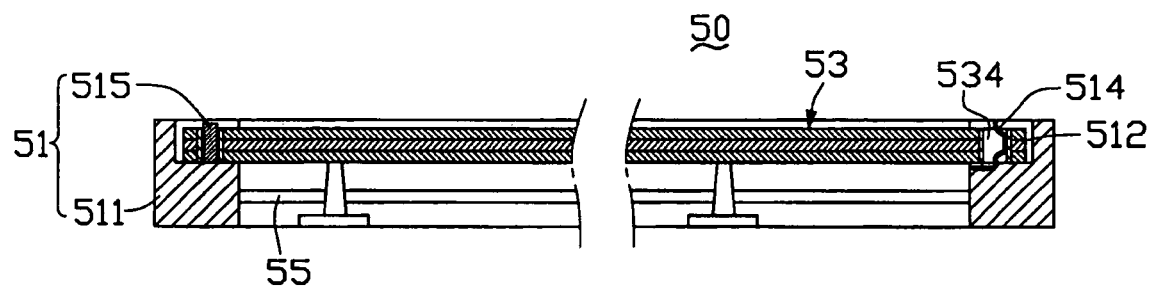
FIG. 5 is a schematic, cross-sectional view of a direct type backlight module according to a second preferred embodiment.
Figure 6:
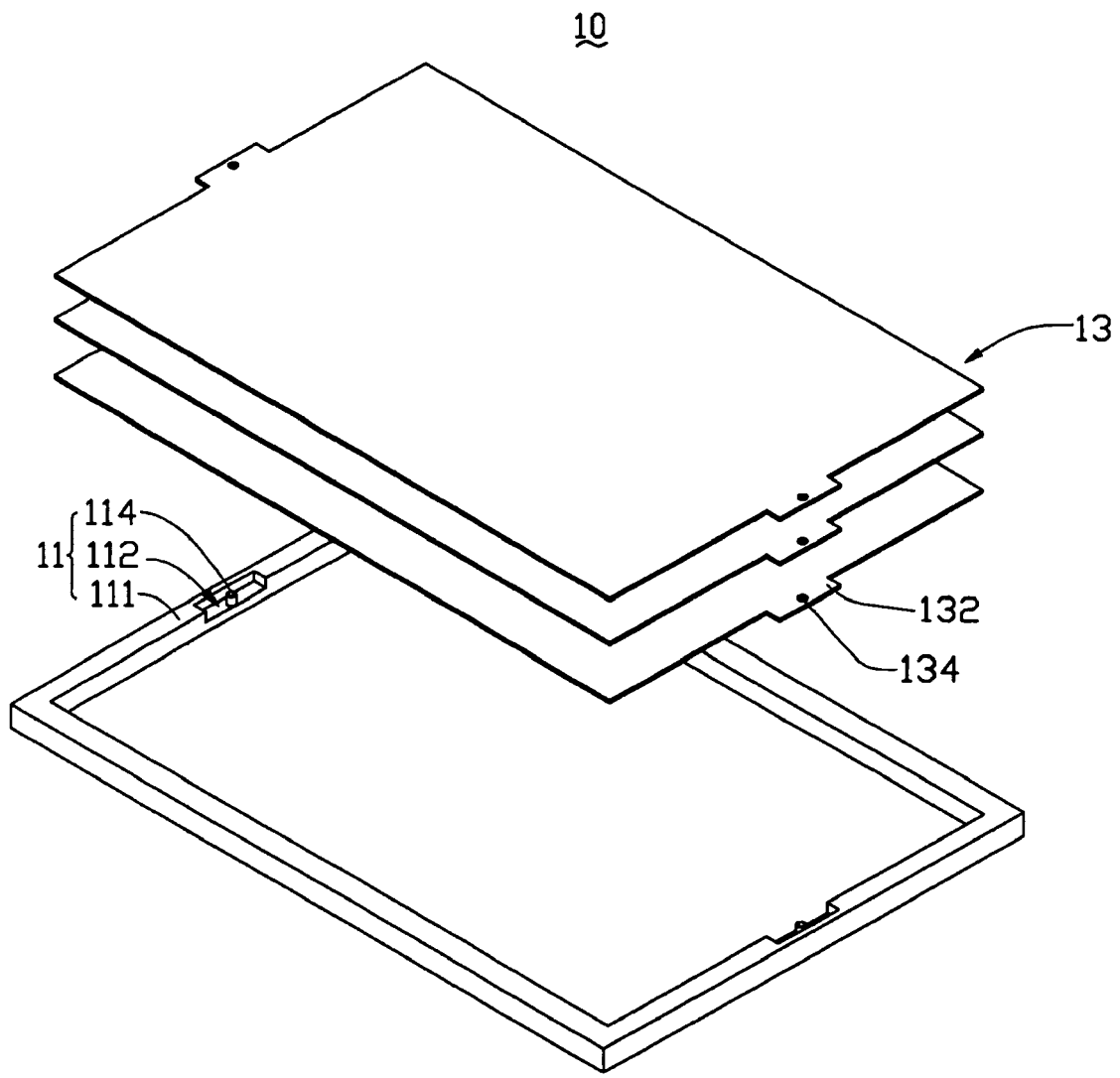
FIG. 6 is a schematic, exploded isometric view of a frame and several optical sheets of a conventional direct type backlight module.

Referring to FIG. 5, a direct type backlight module 50 in accordance with a second preferred embodiment is shown. The direct type backlight module 50 includes a frame 51, three optical sheets 53, and a plurality of cold cathode fluorescent lamps 55. The frame 51 is in a rectangular shape, which includes four peripheral sidewalls 511, two holding portions 512, an elastic member 514 and a positioning pin 515. The two holding portions 512 are respectively formed on a top of the two opposite sidewalls 511. Each holding portion 512 is configured to be the same as the holding portion 212 of the first embodiment. The elastic member 514 and the positioning pin 515 are respectively positioned on a bottom surface of the holding portion 512. Each optical sheet 53 includes two protrusions (not labeled) and two positioning holes 534. The two protrusions are defined in the periphery area of the optical sheets 53 corresponding to the holding portion 512. The two positioning holes 534 are respectively defined in the protrusions according to the positioning pins 514. The cold cathode fluorescent lamps 55 are arranged under the optical sheets 53, and are fixed to the sidewalls 511 of the frame 51.

In assembling, the positioning pin 515 is inserted into the corresponding positioning holes 534, for accurately positioning the optical sheets 53. In addition, the elastic member 514 is mounted into the other positioning hole 534 for pushing an inner surface of the positioning holes 534 toward an outer area of the optical sheets 53, thus a stretching force (not labeled) produced by the resilient bend of the elastic members 514 press the optical sheets 53 along directions facing the outer area of the frame 51. The optical sheets 53 are fixed on the top of the frame 51 by the positioning pin 515 for accurately positioning, and the elastic member 514 for producing the stretching force to avoid the optical sheets 53 being deformed.

It is to be understood that the shape of the present holding portion could also be in a form of circular recess or other shapes having a side opening facing an inner area of the frame, but the shape of the protrusions of the optical sheets should be configured to be same as that of the holding portion. In addition, the holding portion of the present invention could also be configured to a continuous, closed recess along an inner side of the top of the neighboring sidewalls, thus the optical sheets without the protrusions could also be fixed on the top of the frame, and it only requires the optical sheets defines positioning holes therein corresponding to the elastic member and/or positioning pin. It is to be understood that the present backlight module not only may employ one optical sheet, such as a light diffusion sheet used for uniformly diffusing the light emitted from the light source, but also may employ a combination of the optical sheets, for example, the optical sheets includes at least one light diffusion sheet and at least one prism sheet. The present backlight module may further include a reflecting sheet connected with bottom surface of the sidewalls of the frame facing the optical sheets, used for reflecting the light back through the optical sheets to improve a light energy utilization rate. The present backlight module may further include a plurality of supporting columns disposed between the optical sheets and the reflecting sheet, so as to support the optical sheets.

It should be pointed out that at least one elastic member defined in one sidewall of the present frame is necessary, so as to produce at least a stretching force to press the optical sheets for avoiding the optical sheets being deformed. With the help of other elastic member or positioning pin defined in an opposite sidewall (as described in the first and second embodiments in detail), the optical sheets may be better fixed on the top of the frame. It is to be understood that other structures can be defined in the other neighboring sidewalls to help fixing the optical sheets to the top of the frame. In addition, structures, i.e. the elastic member 214 or positioning pin 515 defined in an opposite sidewall, can also be omitted, for example, a holding portion is configured to a continuous, close recess along an inner side of the top of the neighboring sidewalls, for substantially positioning and holding optical sheets.

Finally, while the present invention has been described with reference to particular embodiments, the description is illustrative of the invention and is not to be construed as limiting the invention. Therefore, various modifications can be made to the embodiments by those skilled in the art without departing from the true spirit and scope of the invention as defined by the appended claims.

What is claimed is:

1. A direct type backlight module comprising:
   a frame having a plurality of peripheral sidewalls, at least one holding portion defined in a top of the sidewalls, and an elastic member fixed in the holding portion;
   at least one optical sheet having a positioning hole corresponding to the elastic member, wherein the optical sheet is fixed in the frame by the elastic member being mounted into the positioning hole thereby only pushing a part of an inner surface of the positioning hole towards an outer area of the at least one optical sheet; and
   at least one light source disposed under the optical sheet;
   wherein the holding portion is a continuous, closed recess along an inner side of the top of the neighboring sidewalls.

2. The direct type backlight module according to claim 1, wherein the frame includes at least two holding portions respectively defined on top surfaces of the two opposite sidewalls, and two elastic members respectively formed on the two holding portions; and the at least one optical sheet defines two positioning holes therein corresponding to the elastic members.

3. The direct type backlight module according to claim 1, wherein the frame includes at least two holding portions respectively defined on upper surfaces of the two opposite sidewalls, the elastic member formed on one holding portion, and a positioning pin formed on the other holding portion; and the at least one optical sheet defines two positioning hole therein corresponding to the elastic member and the positioning pin respectively.

4. The direct type backlight module according to claim 1, wherein the optical sheet includes a protrusion defined at the periphery thereof corresponding to the holding portion, and the positioning hole defined in the protrusion corresponding to the elastic member.

5. The direct type backlight module according to claim 1, wherein a stretching force produced by the elastic member pushing the optical sheet along a direction towards the outer area of the frame.

6. The direct type backlight module according to claim 1, wherein the at least one optical sheet can be selected from a group comprising of a light diffusion sheet, a prism sheet, a polarizer sheet and/or a combination thereof.

7. The direct type backlight module according to claim 1, further comprising at least one hollow columnar member engaged in the corresponding positioning hole of the optical sheet.

8. The direct type backlight module according to claim 1, wherein the light source is a cold cathode fluorescent lamp.

9. The direct type backlight module according to claim 1, further comprising a reflecting sheet connected with bottom surface of the sidewalls of the frame, facing the optical sheet.

10. The direct type backlight module according to claim 9, further comprising a plurality of supporting columns disposed between the optical sheets and the reflecting sheet, so as to support the optical sheet.

11. A direct type backlight module comprising:
a frame having a plurality of peripheral sidewalls, at least one holding portion defined in a top of the sidewalls, and an elastic member fixed in the holding portion;
at least one optical sheet having a positioning hole corresponding to the elastic member, wherein the optical sheet is fixed in the frame by the elastic member being mounted into the positioning hole thereby only pushing a part of an inner surface of the positioning hole towards an outer area of the at least one optical sheet; and
at least one light source disposed under the optical sheet;
wherein the frame includes at least two holding portions respectively defined on upper surfaces of the two opposite sidewalls, the elastic member formed on one holding portion, and a positioning pin formed on the other holding portion; and the at least one optical sheet defines two positioning holes therein corresponding to the elastic member and the positioning pin respectively, each holding portion is a recess having a side opening facing an inner area of the frame, and the elastic member is defined on a bottom surface of the recess.

12. A direct type backlight module comprising:
a frame having a pair of opposing sidewalls, and at least one recess defined in a top of the sidewalls, the at least one recess having a side opening facing an inner area of the frame;
a first elastic member defined on a bottom surface of the at least one recess;
at least one optical sheet received between the sidewalls, the at least one optical sheet defining a first positioning hole engagingly receiving the first elastic member therein in a manner such that the at least one optical sheet is resiliently urged toward the other of the sidewalls by the first elastic member; and
at least one light source disposed under the optical sheet and configured for illuminating the at least one optical sheet.

13. The direct type backlight module of claim 12, wherein a second elastic member is formed on the other of the sidewalls, and the at least one optical sheet defines a second positioning hole engagingly receiving the second elastic member therein in a manner such that the at least one optical sheet is resiliently urged toward the one of the sidewalls.

14. The direct type backlight module of claim 12, wherein a positioning pin is formed on the other of the sidewalls, and the at least one optical sheet defines a second positioning hole engagingly receiving the positioning pin therein.

* * * * *